United States Patent

Doutney et al.

(10) Patent No.: US 7,345,447 B2
(45) Date of Patent: Mar. 18, 2008

(54) ADAPTIVE CURRENT CONTROL SYSTEM FOR A STEPPER MOTOR

(75) Inventors: George J. Doutney, Sandy Hook, CT (US); James A. Fairweather, Milford, CT (US); Gary S. Jacobson, Norwalk, CT (US); Michael J. Lorello, Guilford, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 11/416,042

(22) Filed: May 2, 2006

(65) Prior Publication Data

US 2007/0257630 A1  Nov. 8, 2007

(51) Int. Cl.
*G05B 11/01* (2006.01)

(52) U.S. Cl. .................. 318/560; 318/685; 318/696; 318/432

(58) Field of Classification Search ............... 318/560, 318/254, 138, 439, 685, 696, 432
See application file for complete search history.

(56) References Cited

U.S. PATENT DOCUMENTS

| | | | | | |
|---|---|---|---|---|---|
| 5,204,537 | A | * | 4/1993 | Bennet et al. | 250/559.12 |
| 5,838,132 | A | * | 11/1998 | Tanaka | 318/685 |
| 2004/0188919 | A1 | * | 9/2004 | Sakamaki et al. | 271/122 |

* cited by examiner

*Primary Examiner*—Rina Duda
(74) *Attorney, Agent, or Firm*—Ronald Reichman; Angelo N. Chaclas

(57) ABSTRACT

A method and a system are disclosed for adaptively controlling a stepper motor to produce a required torque output based on selection information provided by a sensor or a user/user interface which, in combination with a selector, selects a torque-related value. The selection information provided to the selector for selecting the stepper motor torque-related value may be, for example, the size or thickness of material being handled or the number of accumulated sheets for processing. The torque-related value is predetermined through experimentation and loaded into a lookup table stored in the memory of a motion control system board. The selected torque-related value is provided to a stepper motor driver which supplies the appropriate drive signal(s) to the stepper motor.

23 Claims, 2 Drawing Sheets

ADAPTIVE CURRENT CONTROL SYSTEM FOR A STEPPER MOTOR

FIELD OF THE INVENTION

The present invention is directed to the control of a stepper motor and, more particularly, to adaptively controlling the drive current of the stepper motor to match load torque requirements. With respect to a sheet handling apparatus, such as a mail piece inserter, the drive system, including a stepper motor, is adapted to operate at variable drive currents consistent with several predetermined torque requirements based on the thickness and/or the size of the sheet material.

BACKGROUND OF THE INVENTION

Stepper motors are an important part of many products, such as sheet and insert material handlers used in mail piece inserters. The size of stepper motors required in such devices is directly related to cost. Further, performance issues are intertwined with cost issues for mail piece inserters, as well as other similar devices.

Small stepper motors, on the order of 10-15 watts, are generally more cost-effective and are usually available in many off-the-shelf configurations. Normally, the maximum torque required for a given application dictates the size of the stepper motor used in that application. That is, for a stepper motor used to drive a feed roller, the required torque is typically related to the thickness of the material fed by the feed roller. Feeding thick materials requires more torque compared to feeding thinner materials. Accordingly, even if most feed situations require less torque, normal design criteria calls for a stepper motor capable of meeting the highest torque demands.

As torque requirements increase, the drive current for a stepper motor also increases. High drive current produces a significant amount of heat which can lead to an overheating condition if the motor is energized for long periods of time. As such, the motor's duty cycle, or the amount of time the stepper motor is energized to drive a particular roller or gear, is an additional consideration to obviate overheating conditions. Consequently, when driven to produce high torque, small stepper motors can generate excessive localized heat. It then becomes difficult to address the buildup of excessive heat when such a stepper motor is located in an enclosed or confined area such as a document feed device or folding unit.

Small stepper motors generally produce a significant amount of heat at the high end of its torque range in contrast to larger stepper motors. However, it is typically cost effective to utilize such stepper motors in lightweight, compact consumer and office electronics. As such, it has becomes important to reduce the amount of heat generated by and/or increase the heat transfer from interior stepper motor assemblies while maintaining the ability to produce high levels of torque when necessary.

Several methods have been employed to address the difficulties of such heat generation when small stepper motors have a high duty cycle and operate at the high end of their torque range. These methods principally augment the heat transfer from the stepper motor assembly to the surrounding ambient environment in an effort to reduce the overall operating temperature. However, in sheet handling devices such as mail piece inserters, where package miniaturization is important, these methods become impractical. Further, it is equally impractical to reduce the stepper motor duty cycle in an effort to reduce heat because feed-throughput is a competitive advantage.

Therefore, new methods are needed to reduce the various modes of heat-related failure that occur during high torque operation. New methods are also needed to address the heat generated when the driving current approaches the thermal limits of the stepper motor. Further, a need exists for an improved stepper motor control which is useful in space-limited confined areas, such as mail inserters and similar products.

SUMMARY OF THE INVENTION

An objective of this invention is to provide a method of controlling a stepper motor, such as may be employed in paper handling, processing, folding, or insertion equipment. In as much as the applications are known in advance, it is possible to use laboratory testing in order to determine how a specific stepper motor will behave when used to feed various sizes and types of material so that the motor control can be adjusted accordingly.

The present invention makes use of the measured performance data of actual stepper motors which are driven to meet predetermined mechanical torque loading requirements based on the type and/or size of the material fed through a system to produce drive current data. The drive current data is then programmed into the stepper motor control software. Further, the inventive method adaptively changes the drive current used to energize a stepper motor operating within normal limits to produce a torque output which more accurately corresponds to the type of material passing through the feed or nip rollers. That is, rather than consistently driving the stepper motor at its highest permissible current level, the drive current is set at or driven to predetermined levels, depending on the actual torque requirements.

The method comprises the steps of: sensing/identifying the characteristics of the material loaded into the paper handling device, obtaining a required drive current value for the stepper motor based on the characteristics of the material sensed or identified, setting the stepper motor drive current to the required drive current value, and feeding and further processing the loaded material.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention. As shown throughout the drawings, like reference numerals designate like or corresponding parts.

DETAILED DESCRIPTION OF THE PREFERRED EMBODIMENTS

Figure 1:
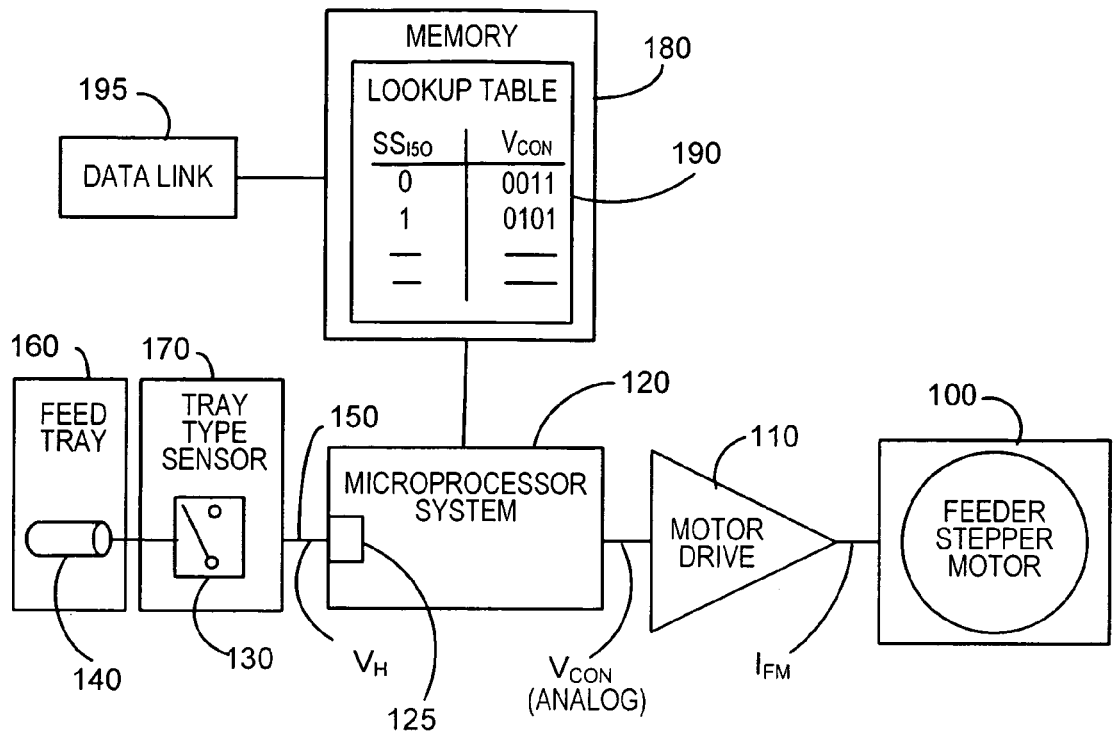
FIG. 1 is a block diagram of an embodiment of a stepper motor control system for a feeding device where the drive current is adapted to produce the required torque based on the type of material being fed into the device.

FIG. 1 illustrates one example of a stepper motor control system for a stepper motor used in a mail inserting machine. A stepper motor 100 is employed in a feeding device to feed one piece at a time from a stack of material previously loaded into a feed tray by an operator. In the case of a mail inserting machine, the printed material can be in single sheet form, or, alternatively, insert material such as booklets of considerable thickness.

Stepper motor 100 is energized and driven by a drive circuit 110. The drive circuit 110 sets the feeder motor current $I_{FM}$ based on the control voltage $V_{CON}$ received from the feeder motion control processor system 120. In turn, motion control processor system 120 sets the control voltage $V_{CON}$ based on the input provided by tray sensor 130.

Tray sensor 130 is used to identify the type of feed tray placed into the inserter feed device. An inserting machine having multiple sheet/material feed devices (locations) incorporates a removable feed tray 160 for each inserter feed device. These removable feed trays usually come in two types, a sheet feed tray and an insert material feed tray.

Sheet feed trays are designed to hold sheet-sized material which is generally thin single-sheet stock (i.e., 8½"×11", A4, etc.). On the other hand, insert material feed trays are sized to hold insert-type material which can be thicker (and not as long) in contrast to single-sheet stock.

Insert material is typically sized to fit into a receiving envelope without the need for folding. Because folding is not required, insert material can be thicker than sheet material, which is typically folded prior to insertion into an envelope.

Each type of feed tray 160 is provisioned with a unique identifier 140 which can be detected by a tray sensor 130 located within the inserter feed device (not shown). When a particular type of feed tray is placed into an inserter feed device, tray sensor 130, in conjunction with the unique identifier 140, identifies the type of feed tray and provides this information to the motion control processor system 120.

The tray sensor 130 can be any type of magnetic Hall-effect sensor, optical sensor, conductive electrodes, or any other type of sensor that provides an identification signal to the motion control processor system 120. For example, each feed tray 160 may be provided with a barcode identifier which is scanned by an optical sensor. In the described embodiment of FIG. 1, tray sensor 130 is a Hall-effect sensor.

The tray sensor 130 provides an output signal 150 to the motion control processor system 120. However, the output signal 150 is merely a selection signal used to identify a paper-related attribute (e.g., size (length and width), thickness, composition, number of accumulated sheets, etc.) which is used, in turn, to select a required stepper motor torque output. Accordingly, the selection signal 150 can originate from a sensor, a user/user interface, a software program, a demultiplexor, a personal computer, or any other device which, in combination with the selector 125, selects a torque-related output from two or more available selections. As such, the selector 125 can be implemented by way of software or hardware, including a demultiplexer, a decoder, a programmable logic circuit, a processor, a central processor unit, an input/output interface, an input/output controller, a microprocessor, a microcontroller, a selector circuit, or a motion control processor The unique identifier 140 can be any item commonly used in conjunction with the tray sensor 130 to provide the required output signal 150. In the described embodiment of FIG. 1, the unique tray identifier 140 is a magnet which, in conjunction with Hall-effect tray sensor 130, produces a Hall Voltage $V_H$. Depending on the composition, size, location, number, or absence of the magnet 140 with respect to a particular feed tray 160, the tray sensor 130 will output a unique Hall Voltage $V_H$ signal which the motion control processor system 120, by way of the selector 125, interprets to identify the type of feed tray loaded in the feed device.

For example, a predetermined voltage $V_H$, based upon experimentation for a given unique identifier 140, can be associated with a sheet feed tray. Similarly, the absence of a voltage $V_H$, which indicates a feed tray 160 without a unique identifier 140, could be associated with an insert material feed tray. Further, by employing two or more unique identifier magnets 140 with a single feed tray 160, and a corresponding number of feed tray sensors 130, several different types of feed trays can be identified using binary logic where a "0" represents the absence of a voltage $V_H$, and a "1" represents the presence of a voltage $V_H$ (i.e., 00=a sheet feed tray, 01=an insert material feed tray, and 10 represents a third type of feed tray). In any event, by identifying the type of feed tray placed into the inserter feed device, the type of material loaded into the feed tray 160 is also known.

The stepper motor 100 is adapted to produce a greater amount of torque when feeding thick insert material compared to feeding thin sheet material. Similarly, when the stepper motor 100 is producing a constant rotational velocity (i.e., producing a relatively constant feed-throughput), torque output from the stepper motor 100 is proportional to the drive current (feeder motor current $I_{FM}$). Accordingly, when the motion control processor system 120, by way of the selector 125, determines that a given type of feed tray 160 has been loaded into the feed device, a series of steps are employed to set the required torque level by setting the corresponding feeder motor current $I_{FM}$ for the stepper motor 100.

Figure 2:
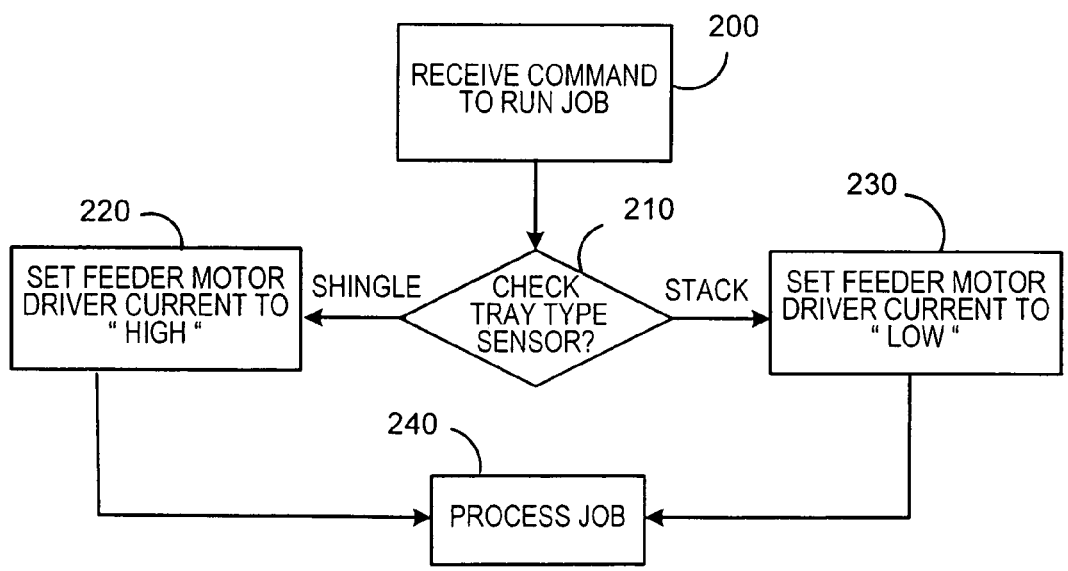
FIG. 2 is a flow chart illustrating the embodiment depicted in FIG. 1.

With reference to FIG. 2, at step 200, the motion control processor system 120 receives command signals from the main processor (not shown) to initiate a feed job. At step 210, the motion control processor system 120, by way of selector 125, processes the output signal 150 from the feed tray sensor 130. In FIG. 2, the output signal 150 from the feed tray sensor 130 will reflect that one of two types of feed trays has been loaded in the feed device. If the selection signal 150 from the feed tray sensor 130 indicates that an insert material (short length) feed tray has been loaded into the feed device, at step 220 the motion control processor system 120, by way of the selector 125, selects and outputs a "high" control voltage $V_{CON}$ to drive circuit 110.

If the selection signal 150 from feed tray sensor 130 indicates that a sheet feed tray has been loaded into the feed device, at step 230 the motion control processor system 120, by way of the selector 125, selects and outputs a low control voltage $V_{CON}$ to drive circuit 110. In turn, at step 240, the processing of the feeding job begins with the drive circuit 110 energizing the stepper motor 100 with the corresponding "high" or "low" feeder motor current $I_{FM}$. That is, if the control voltage $V_{CON}$ is "high", the feeder motor current $I_{FM}$ will be "high" to produce a corresponding "high" torque. Similarly, if the control voltage $V_{CON}$ is "low", the feeder motor current $I_{FM}$ will be "low" to produce a corresponding "low" torque.

In this example, references to "high" or "low" voltage, current, or torque are meant for convenience only. The torque required to feed each type of material from the feed trays, at a prescribed feed-throughput, may be determined through experimentation. Similarly, when the required torque values are established, the corresponding control voltages $V_{CON}$ and feeder motor currents $I_{FM}$ for the specific stepper motor may also be determined.

In practice, for each required torque level, the corresponding control voltages are written as digital values preferably into a lookup table 190 stored in a memory 180 available to the motion control processor system 120. The lookup table 190 can be populated with predetermined values obtained through experimentation during the manufacturing process or initialized and/or updated in the field by downloading the necessary data from a data link 195.

When the motion control processor system 120, by way of the selector 125, identifies the type of feeder tray 160 loaded into the feeder device, the corresponding digital value of the actual control voltage $V_{CON}$ is retrieved by the selector 125 from the lookup table 190 in memory 180 and sent to a digital-to-analog converter (not shown) where it is converted into an analog control voltage $V_{CON}$ compatible with the drive circuit 110. The magnitude of the analog control voltage $V_{CON}$ determines the magnitude of the feeder motor current $I_{FM}$ and the torque supplied by the stepper motor 100.

Of course, where the driver circuit 110 requires an analog control voltage signal input to produce the appropriate drive current (and corresponding stepper motor torque), the digital value of the control voltage will be the variable stored in the lookup table 190. On the other hand, if the particular stepper motor control system responds to an actual torque value or an actual drive current value, then the lookup table 190 can be designed to store and output, based on a selection from a selector, either torque or drive current values. Further, if a digital-to-analog converter is used, as in this example, the stored variable would be represented in the lookup table 190 digitally and, when read out, converted to an analog control value.

As mentioned in the Background of the Invention, the heat generated by the stepper motor 100 is proportional to the drive current and, therefore, the required torque output. In addition, the total amount of heat generated over time is dependant on the duty cycle of the stepper motor 100. In a typical feeding device, feeding sheet material is performed at a high duty cycle compared to feeding insert material. This occurs because insert material is typically shorter in length, relative to the feed direction, as compared to standard sheet stock. Therefore, given a constant feed-throughput, a stepper motor is energized for a proportionally longer duration when feeding sheet stock.

The inventor of the present stepper motor adaptive control system noted the above-described relation between the required stepper motor torque and drive current (and, therefore, generated heat). In addition, the inventor also noted that a relatively constant feed-throughput could still be maintained with the stepper motor 100, with respect to feeding insert material or sheet stock, even if the drive current was reduced, as long as the required torque was also proportionally less. As a result, the heat generated by the stepper motor 100 could be significantly reduced with respect to feed operations. That is, the stepper motor 100 operates at a high duty cycle when feeding sheet stock but requires less drive current. While the stepper motor 100 is energized for a longer duration, a lower drive current produces less heat compared to a high drive current.

On the other hand, because the required torque is greater for feeding insert material, the heat generated by the stepper motor 100 when feeding thick insert material is proportionally higher compared to feeding sheet stock. However, because the duty cycle for feeding insert material is proportionally less (insert material must be sized shorter to fit into a receiving envelope without folding), the heat generated is reduced when the stepper motor 100 produces a constant feed-throughput. As a result, by adapting the required torque produced by the stepper motor 100 for the type of material loaded in the feed tray 160, the present invention reduces the heat generated by the stepper motor 100 when the feeding device is set to produce a relatively constant feed-throughput.

Figure 3:
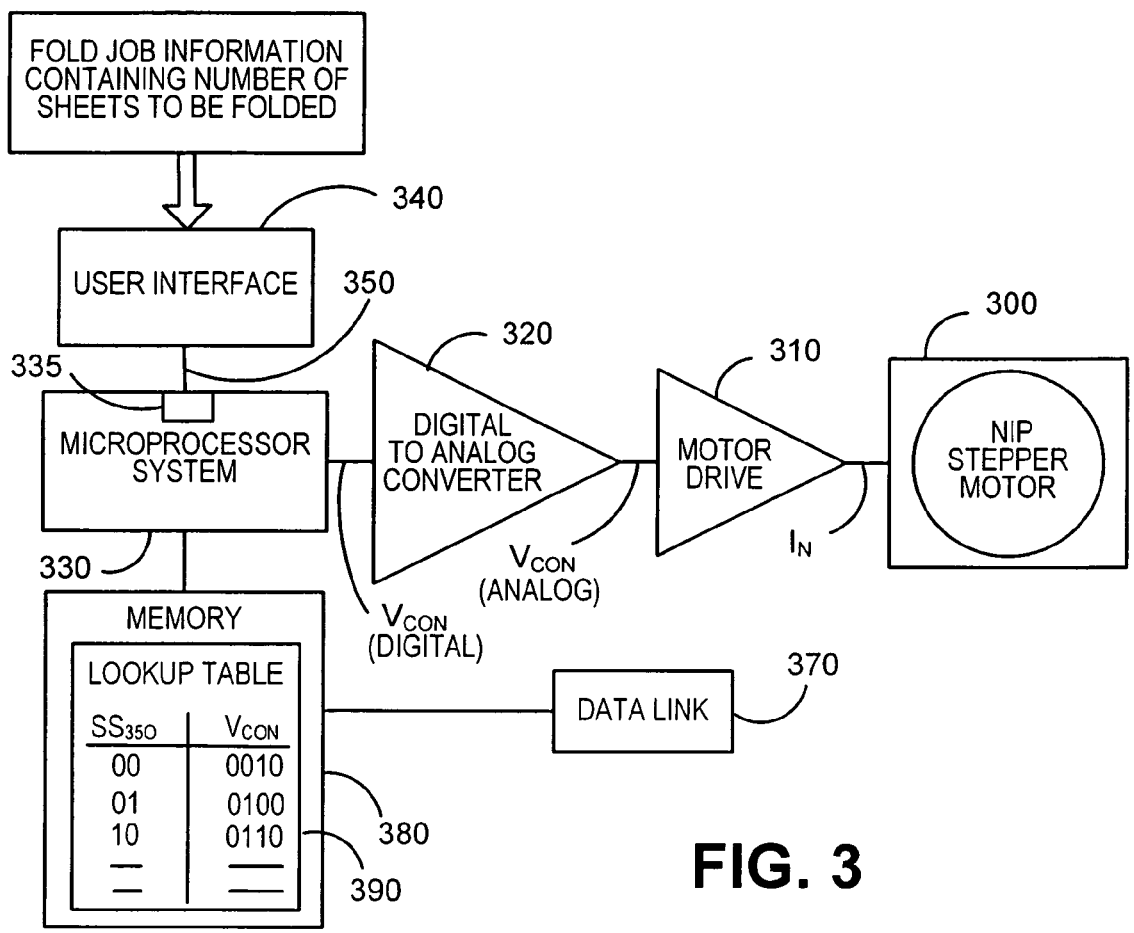
FIG. 3 is a block diagram of another embodiment of a stepper motor control system for a folding device where the drive current is adapted to produce the required torque based on the number of sheets accumulated by the device for folding.

This same rationale was applied to controlling the stepper motors found in folding units. FIG. 3 illustrates an example of an adaptive stepper motor control system for a stepper motor 300 used in a folding station (not shown) for a mail inserting machine. A stepper motor 300 is employed downstream of a feeding device to fold single or multiple sheet stock material prior to insertion into a mail envelope. In the case of a typical small-office mail inserting machine, the number of sheets folded in a single instance can range, for example, from one (1) to eight (8). Typical small-office mail inserters produce several fold styles including a C-fold, a Z-fold, and a half-fold.

Stepper motor 300 is energized and driven by the drive circuit 310. A drive circuit 310 sets the nip motor current $I_N$ based on the analog control voltage $V_{CON}$ received from the digital-to-analog converter 320. Thereafter, the digital-to-analog converter 320 converts the digital value of the control voltage $V_{CON}$ received from the nip motion control processor system 330. In turn, a motion control processor system 330 retrieves the digital value of the control voltage $V_{CON}$ from a lookup table 390 stored in memory 380 based on a set-up input signal 350 (a selection signal) provided by the user and entered by way of user interface 340.

In practice, for each required torque level, the corresponding control voltages are written as digital values, preferably into a lookup table 390 stored in a memory 380 of motion control processor system 330. The lookup table 390 can be populated with predetermined values obtained through experimentation during the manufacturing process or initialized and/or updated in the field by downloading the necessary data from a data link 370.

User interface 340 provides a set-up input signal 350 to the motion control processor system 330. The set-up input signal 350 is provided to selector 335 to identify the number of sheets that need to be folded before being inserted into an envelope. Before a mail creation job is started, the user programs the inserter (not shown) to take into account, inter alia, the number of accumulated individual sheets which make up a single mail piece insert.

For a typical job, individual sheets are fed into the inserter from various feed devices. As the sheets are fed into the inserter, a gap is generated and maintained between the individual sheets to provide proper page breaks which enable collation and accumulation functions. After the sheets are accumulated, they are folded within a folding unit and conveyed downstream for further processing, including insertion into an envelop, before the finished mail piece enters the mailstream.

The stepper motor 300 is capable of rapid acceleration and deceleration. Within the folding unit, the stepper motor 300 produces a greater amount of torque when positioning several accumulated sheets for folding, compared to a single sheet, before initiating the required folding process. When accelerating or decelerating, the torque output from the stepper motor 300 is proportional to the drive current (nip motor current $I_N$). Accordingly, when the motion control processor system 330, by way of the selector 335, receives set-up input signal 350, a series of steps are followed to set the required torque level by setting the corresponding drive current $I_N$ for the stepper motor 300.

Figure 4:
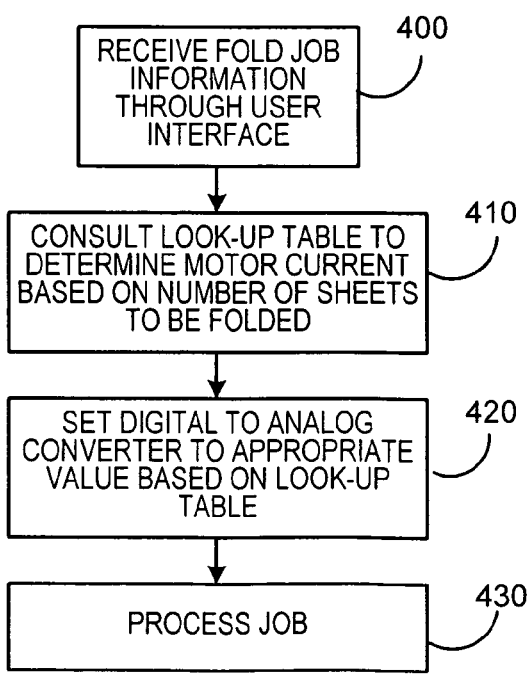
FIG. 4 is a flow chart illustrating the embodiment depicted in FIG. 3.

In FIGS. 3 and 4, the motion control processor system 330, by way of the selector 335, receives a set-up input signal 350 from the user interface 340 at step 400. The set-up input signal 350 is provided to selector 335 which determines the number of accumulated sheets for each folding step which, in the illustrated embodiment, will range from one (1) sheet to eight (8) sheets. At step 410, the motion control processor system 330, by way of the selector 335, uses the set-up input signal 350 to enter a lookup table 390, stored in memory 380, which contains corresponding digital values for the control voltage $V_{CON}$.

For example, each value for set-up signal 350, within the range of permissible values 1-8, may have a unique corresponding control voltage $V_{CON}$, established by experimentation, which ultimately results in the stepper motor being driven at the required torque level. In the alternative, the permissible range for set-up signal 350 can be divided into two or more groups, where each group is associated with a unique corresponding control voltage $V_{CON}$ from the lookup table (i.e., for 1-2 sheets, $V_{CON}=V_1$; for 3-5 sheets, $V_{CON}=V_2$; and for 6-8 sheets, $V_{CON}=V_3$). In this embodiment, it was found through experimentation that three (3) incremental levels of torque for stepper motor 300 would adequately handle fold positioning for three (3) corresponding ranges of accumulated sheets.

When the motion control processor system 330, by way of the selector 335, selects the appropriate control voltage $V_{CON}$ from the lookup table 390, at step 420, a digital value is sent to the digital-to-analog converter 320 where it is converted into a corresponding analog control voltage $V_{CON}$ compatible with the drive circuit 310. The magnitude of the analog control voltage $V_{CON}$ determines the magnitude of the nip motor current $I_N$ and the torque value supplied by the stepper motor 300. Thereafter, at step 430, the folding job is processed with the stepper motor 300 supplying the appropriate torque value for the number of accumulated sheets being folded.

In a typical folding station, folding several accumulated sheets is done at a lower duty cycle compared to folding one or two sheets. This occurs because it takes a proportionally longer time for the folding unit to accumulate several sheets downstream from the feeding devices compared to accumulating one or two sheets. During this period of inactivity, the stepper motor 300 is not energized. Accordingly, when the set-up input signal 350 calls for folding several accumulated sheets, the stepper motor 300 is energized for a proportionally shorter duration relative to each fold operation. This reduces the generation of heat during the overall cycle.

The inventor of the present stepper motor control system noted the above-described relation between the number of folded accumulated sheets, the required stepper motor torque and drive current (and, therefore, generated heat), and the inverse relationship between these and the stepper motor duty cycle. As a result, the heat generated by the stepper motor 300 could be significantly reduced with respect to the folding operation because operating at a high duty cycle when folding a small number of accumulated sheets requires less drive current. That is, while the stepper motor 300 is energized for a longer duration (it takes less time for one or two sheets to accumulate), the lower drive current produces less heat over time.

On the other hand, because the required torque is greater for folding several accumulated sheets, the heat generated by the stepper motor 300, while it is energized, is proportionally higher compared to when it is energized to fold one or two sheets. However, because the duty cycle for folding several accumulated sheets is proportionally less compared to the duty cycle for folding one or two sheets, the total heat generated over the entire folding process is reduced while maintaining the required throughput. As a result, by adapting the required torque produced by the stepper motor 300 for the number of accumulated sheets being folded, the present invention reduces the heat generated by the stepper motor 300 when the folding unit is running at the required mail piece insert throughput.

In summary, a system and a method is provided for adaptively controlling a stepper motor to produce required torque outputs in response to a selection signal indicative of the type of material being fed by a feeder or the number of accumulated sheets being folded by a folding station. The system may include a memory for storing predetermined stepper motor control values indicative of the required torque outputs which are selected based on the selection signal and employed by a drive circuit to drive the stepper motor at the required torque output. Alternatively, other elements and means can be envisioned for storing and selecting the predetermined stepper motor control values. For example, the predetermined stepper motor control values may be stored in a lookup table, produced by a program structure or program code, or may reside in a machine code array. Similarly, a demultiplexer, a decoder, a programmable logic device, or a program structure, program code, or machine code instructions may be used to select the specific control value which corresponds to a given selection signal.

In any event, the adaptive current control of the present invention dispenses with complex control algorithms and/or circuitry and, instead, takes advantage of laboratory testing on specific stepper motors faced with typical torque conditions. This reduces the overall heat generated by the stepper motor assembly without sacrificing the required torque performance of the stepper motor or the overall feed-throughput of the feeder or folding station.

While the present invention has been disclosed and described with reference to two embodiments thereof, it will be apparent, as noted above, that variations and modifications may be made therein without departing from the scope of the invention, and it is intended that all matter contained in the above description or shown in the accompanying drawings shall be interpreted as illustrative and not in a limiting sense. The invention disclosed herein can be implemented by a variety of combinations of hardware and software, and those skilled in the art will understand that those implementations are derivable from the invention as disclosed herein. It is, thus, intended in the following claims to cover each variation and modification that falls within the true spirit and scope of the present invention.

What is claimed is:

1. A stepper motor control system comprising:
   a stepper motor;
   a memory for storing a plurality of predetermined values indicative of desired stepper motor torque outputs;
   a sensor for identifying a material;
   a selector for selecting a desired stepper motor torque output by selecting one of said predetermined values; based upon the material sensed;
   a motion control processor for supplying a stepper motor control signal as a function of at least the selected one of said predetermined values; and
   a stepper motor drive circuit for driving the stepper motor in response to the stepper motor control signal.

2. The stepper motor control system of claim 1 further comprising a sensor, wherein the sensor issues the selection signal.

3. The stepper motor control system of claim 2, wherein the predetermined values are stored in a lookup table.

4. The stepper motor control system of claim 2, wherein the sensor is a feed tray sensor.

5. The stepper motor control system of claim 4, wherein the feed tray sensor is at least one Hall-effect sensor.

6. The stepper motor control system of claim 1, wherein the sensor signal is indicative of a thickness of a material.

7. The stepper motor control system of claim 1, wherein the sensor signal is indicative of a set-up input.

8. The stepper motor control system of claim 1, wherein the sensor signal is indicative of a type of material.

9. The stepper motor control system of claim 2, wherein the sensor signal is indicative of a size of a material.

10. The stepper motor control system of claim 7, further comprising:
a user interface for receiving the set-up input.

11. The stepper motor control system of claim 1, wherein the predetermined values are control voltages.

12. The stepper motor control system of claim 1, wherein the predetermined values are drive currents.

13. The stepper motor control system of claim 1, wherein the predetermined values are torque values.

14. The stepper motor control system of claim 1 further comprising a data link, wherein the predetermined values are downloaded into the memory from the data link.

15. The stepper motor control system of claim 3 further comprising a data link, wherein the predetermined values are downloaded into the lookup table from the data link.

16. A method of controlling a stepper motor, comprising:
storing in a memory predetermined values indicative of desired stepper motor torque outputs;
sensing a material;
selecting a desired stepper motor torque output by selecting one of said predetermined values; based on the material sensed;
supplying a stepper motor control signal as a function of at least the selected one of said predetermined values; and
driving the stepper motor in response to the stepper motor control signal.

17. The method of controlling a stepper motor of claim 16 further comprising:
downloading the predetermined values into the memory from a data link.

18. The method of controlling a stepper motor of claim 16 further comprising:
formatting as a lookup table the predetermined values stored in the memory.

19. A stepper motor control system comprising:
storage means for storing predetermined values indicative of desired stepper motor torque outputs;
a sensor means for sensing material;
a selection means for selecting a desired stepper motor torque output by selecting one of said predetermined values; based upon the material sensed;
a motion control processor for supplying a stepper motor control signal as a function of at least the selected one of said predetermined values; and
a stepper motor driver for driving the stepper motor in response to the stepper motor control signal.

20. The stepper motor control system of claim 19, wherein the storage means is a hardware memory selected from the group consisting of a memory device, a programmable logic circuit, a microprocessor, a microcontroller, an onboard cache, a RAM, a ROM, an EPROM, motion control processor, and a flash memory.

21. The stepper motor control system of claim 19, wherein the storage means is a software program.

22. The stepper motor control system of claim 19, wherein the selection means is a hardware device selected from the group consisting of a demultiplexer, a decoder, a programmable logic circuit, a processor, a central processor unit, an input/output interface, an input/output controller, a microprocessor, a microcontroller, a selector circuit, and a motion control processor.

23. The stepper motor control system of claim 19, wherein the selection means is a software program.

* * * * *